US006532250B1

(12) United States Patent
Palenius et al.

(10) Patent No.: US 6,532,250 B1
(45) Date of Patent: Mar. 11, 2003

(54) METHODS AND APPARATUS FOR SPREADING AND DESPREADING INFORMATION SIGNALS IN CODE DIVISION MULTIPLE ACCESS COMMUNICATIONS SYSTEMS

(75) Inventors: Torgny Palenius, Lund (SE); Martin Jonsson, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/468,111

(22) Filed: Dec. 21, 1999

(51) Int. Cl.[7] .................................................. H04J 13/04
(52) U.S. Cl. ........................................ 375/141; 370/335
(58) Field of Search ................................. 370/320, 335, 370/342, 465, 479; 375/140, 146, 147, 225, 377, 141, 145

(56) References Cited

U.S. PATENT DOCUMENTS

| 5,544,156 A | 8/1996 | Teder et al. |
| 5,566,206 A | 10/1996 | Butler et al. |

(List continued on next page.)

FOREIGN PATENT DOCUMENTS

| EP | 0 763 902 A1 | 9/1996 |
| GB | 2 301 999 A | 8/1996 |
| WO | 95/08888 | 3/1995 |

OTHER PUBLICATIONS

TS 25.201 V2.1.0 (Jun. 1999), 3rd Generation Partnership Project (3GPP); Technical Specification Group (TSG) Radio Access Network (RAN); Working Group 1 (WG1); Physical layer—General description.

(List continued on next page.)

*Primary Examiner*—Thanh Cong Le
*Assistant Examiner*—T Richard Lei
(74) *Attorney, Agent, or Firm*—Burns, Doane, Swecker & Mathis, L.L.P.

(57) ABSTRACT

Code Division Multiple Access (CDMA) spreading and despreading techniques eliminate the need for frame-length chip buffers within despreading and demodulation processors in CDMA receivers. According to the invention, successive CDMA frames are transmitted with variable spreading factors and a constant spreading sequence chip rate to provide a variable data throughput rate, each transmitted frame thus including a variable number of data symbols and a variable number of rate indication symbols. During transmission, channelization spreading sequences used for higher data rate frames are guaranteed to be subsets of channelization spreading sequences used for lower data rate frames. Consequently, a CDMA despreading processor according to the invention can despread incoming data symbols as they arrive at a CDMA receiver, storing the resulting symbols to a memory which must exist irrespective of the despreading process (e.g., within a deinterleaver or error detection and correction decoder). For example, incoming chips can be despread using a minimum allowable spreading rate and, upon receiving the rate information symbols included in the incoming frame, a determination can be made as to whether despreading is complete. If it is determined that the frame was spread using the minimum allowable spreading factor, then the stored data symbols are accepted as finally despread data symbols and further reception processing continues directly. Otherwise, the stored data symbols are taken to be temporary symbols which are then combined, using the guaranteed relationships between fast and slow spreading sequences, to generate the finally despread data symbols. Advantageously, a CDMA receiver according to the invention can thus operate successfully without requiring a frame-length despreading chip buffer.

6 Claims, 4 Drawing Sheets

U.S. PATENT DOCUMENTS

| | | | | |
|---|---|---|---|---|
| 5,673,266 | A | * | 9/1997 | Li .............................. 370/465 |
| 5,710,784 | A | | 1/1998 | Kindred et al. |
| 5,831,978 | A | * | 11/1998 | Willars et al. .............. 370/335 |
| 6,108,369 | A | * | 8/2000 | Ovesjo et al. .............. 375/146 |
| 6,222,875 | B1 | * | 4/2001 | Dahlman et al. ........... 370/342 |
| 6,233,231 | B1 | * | 5/2001 | Felix et al. .................. 370/335 |

OTHER PUBLICATIONS

TS 25.211 V2.1.0 (Jun. 1999), $3^{rd}$ Generation Partnership Project (3GPP); Technical Specification Group (TSG) Radio Access Network (RAN); Working Group 1 (WG1); Physical channels and mapping of transport channels onto physical channels (FDD).

TS 25.212 V1.1.0 (Jun. 1999), $3^{rd}$ Generation Partnership Project (3GPP); Technical Specification Group (TSG) Radio Access Network (RAN); Working Group 1 (WG1); Multiplexing and channel coding (FDD).

TS 25.213 V2.1.0 (Apr. 1999). $3^{rd}$ Generation Partnership Project (3GPP); Technical Specification Group (TSG) Radio Access Network (RAN); Working Group 1 (WG1); Spreading and modulation (FDD).

TS 25.214 V1.1.0 (Jun. 1999), $3^{rd}$ Generation Partnership Project (3GPP); Technical Specification Group (TSG) Radio Access Network (RAN); Working Group 1 (WG1); Physical layer procedures (FDD).

Dahlman, Erik et al., "UMTS/IMT–2000 Based on Wideband CDMA." IEE Communications Magazine, vol. 36, No. 9, Sep. 1998, pp. 70–80.

* cited by examiner

METHODS AND APPARATUS FOR SPREADING AND DESPREADING INFORMATION SIGNALS IN CODE DIVISION MULTIPLE ACCESS COMMUNICATIONS SYSTEMS

FIELD OF THE INVENTION

The present invention relates to spread spectrum communications systems, and more particularly, to transmission and reception processing of information signals within spread spectrum communications systems.

BACKGROUND OF THE INVENTION

In code division multiple access (CDMA) communications systems, both direct sequence (DS) systems and frequency hopping (FH) systems, it is often desirable that signal transmitters and receivers be capable of accommodating variable data throughput rates. For example, CDMA transmitters and receivers are often used to communicate digital packet data for multiple logical and physical channels, each channel possibly requiring a different data transmission rate. Additionally, CDMA transmitters and receivers sometimes must alternately convey both packet data and continuous data.

Thus, if a CDMA transmitter or receiver is not configured to accommodate varying data throughput rates, overall system quality can be significantly degraded. For example, if logical channels of varying data rate are input to a constant data rate CDMA transmitter, buffering in the transmitter will lead to signal delay during periods when the data input rate exceeds the constant data rate of the transmitter. Alternately, when the data input rate drops below the constant data rate of the transmitter, the transmitter must either fill outgoing data frames with dummy bits, thereby reducing system capacity, or resort to discontinuous transmission (DTX), which can lead to spectral jamming of proximate equipment.

Accordingly, recent spread spectrum systems have been designed specifically to accommodate varying data throughput rates. For example, the recently developed Universal Mobile Telecommunications System (UMTS)/International Mobile Telecommunications in the year 2000 (IMT-2000) standards include provisions for variable data rate transmission. See, for example, E. Dahlman et al., UMTS/IMT-2000 Based on Wideband CDMA, IEEE Communications Magazine, Vol. 36, No. 9, September 1998, pp. 70–80, which is incorporated herein in its entirety by reference. The UMTS/IMT-2000 standards are also described in detail in a number of technical specifications put forth by the well known $3^{rd}$ Generation Partnership Project (3GPP™).

While such variable data rate systems do overcome the above described problems of signal delay, reduced system capacity and discontinuous transmission, they can introduce other difficulties. For example, in the above described IMT-2000 and other standards, variable data rates are achieved by applying a variable per-packet spreading factor (e.g., variable-rate data symbols are spread using constant rate pseudo-noise, or PN, spreading sequences), and the spreading factor used for each particular data packet is included in, and transmitted with, the data packet itself. However, the spreading factor is typically transmitted via a number of rate indication symbols which are spread throughout the data packet, and the spreading factor therefore cannot be determined at a receiver until the end of the data packet. Consequently, known receivers must collect an entire incoming data packet before despreading can begin. As a result, known variable data rate despreaders include very large memory buffers and are therefore rather costly and inefficient. Thus, there is a need for improved methods and apparatus for transmitting and receiving variable data rate information signals in spread spectrum communications systems.

SUMMARY OF THE INVENTION

The present invention fulfills the above-described and other needs by providing CDMA spreading and despreading techniques which eliminate the need for a frame-length chip buffer within the despreading and demodulation processor of a CDMA receiver. According to the invention, successive CDMA frames are transmitted with variable spreading factors and a constant spreading sequence chip rate to provide a variable data throughput rate. Thus, as in many well known CDMA standards (e.g., the above described UMTS/IMT-2000 standard), each CDMA frame includes a variable number of data symbols and a variable number of rate indication symbols which are transmitted in slots throughout the frame.

According to the invention, however, channelization spreading sequences used for higher data rate frames (i.e., frames having lower spreading factors) are guaranteed to be subsets of channelization spreading sequences used for lower data rate frames (i.e., frames having higher spreading factors). As a result, a CDMA despreading processor can despread incoming data symbols as they arrive at a CDMA receiver, rather than having to collect all of the incoming PN chips for a frame before despreading the frame.

Specifically, a CDMA despreader according to the invention despreads incoming chips using a minimum allowable spreading rate, and the resulting despread data symbols are stored to memory (e.g., within a deinterleaver or error detection and correction processor in the CDMA receiver, which typically require frame-length data symbol buffers, irrespective of operation of the despreader and demodulator). Then, at the end of the incoming frame, the received rate information symbols are decoded to determine the actual spreading factor used in spreading the frame during transmission. If it is determined that the frame was actually spread using the minimum allowable spreading factor, then the stored data symbols are accepted as the finally despread data symbols, and deinterleaving and error detection and correction decoding is carried out directly using the stored data symbols. Otherwise, the stored data symbols are taken to be temporary, or soft, data symbols which are then combined, using the guaranteed relationships between fast and slow spreading sequences, to generate the finally despread data symbols. Advantageously, the conversion from temporary data symbols to finally despread data symbols can be carried out within the deinterleaver or error detection and correction processor. As a result, a CDMA receiver according to the invention can operate successfully without a frame-length chip buffer and is therefore less expensive and more efficient as compared to conventional receivers.

According to the invention, an exemplary code division multiple access transmitter for transmitting a succession of source data frames, each source data frame including a sequence of source data symbols, and each source data frame being intended for a distinct recipient, includes a spreading and modulation processor configured to spread each source data symbol within a source data frame, using any one of a plurality of predefined spreading sequences, to provide a spread spectrum signal for transmission to one or more spread spectrum receivers. According to the invention, each spreading sequence provides one of a plurality of possible spreading factors. Additionally, rate information is included in each transmitted data frame to indicate a spreading factor used in spreading the transmitted data frame, and first, higher-order spreading factor used in spreading data frames for a particular recipient is guaranteed to be an arithmetic combination of multiple copies of a second, lower-order spreading factor used in spreading data frames for the particular recipient.

An exemplary method for transmitting a succession of code division multiple access source data frames, each source data frame including a sequence of source data symbols, and each source data frame being intended for a distinct recipient, includes the steps of: spreading each source data symbol within a source data frame, using any one of a plurality of predefined spreading sequences, to provide a spread spectrum signal for transmission to one or more spread spectrum receivers, each spreading sequence providing one of a plurality of possible spreading factors; including rate information in each transmitted data frame to indicate a spreading factor used in spreading the transmitted data frame; and guaranteeing that a first, higher-order spreading factor used in spreading data frames for a particular recipient is an arithmetic combination of multiple copies of a second, lower-order spreading factor used in spreading data frames for the particular recipient.

According to the invention, an exemplary code division multiple access receiver, includes: a despreading processor for despreading an incoming spread spectrum data frame based on a minimum allowable spreading factor; and a memory for storing data symbols resulting from the despreading based on the minimum allowable spreading factor. The incoming data frame includes rate information indicating an actual spreading factor used in transmitting the incoming data frame, and the data symbols stored in the memory as a result of the despreading based on the minimum allowable spreading factor are combined to provide refined data symbols when the actual spreading factor is determined to be greater than the minimum allowable spreading factor. The exemplary receiver can further include a deinterleaver, and the deinterleaver can be used as the memory for storing data symbols.

A exemplary method of receiving spread spectrum data frames, each data frame including rate information indicating an actual spreading factor used in transmitting the data frame, includes the steps of: despreading an incoming spread spectrum data frame using a minimum allowable spreading factor; storing data symbols resulting from despreading the incoming data frame to a memory; decoding the rate information included in the incoming data frame to determine the actual spreading factor; and combining the data symbols stored in the memory to provide refined data symbols when the actual spreading factor is determined to be greater than the minimum allowable spreading factor. The memory can be, for example, a deinterleaver in a spread spectrum receiver.

The above-described and other features and advantages of the invention are explained in detail hereinafter with reference to the illustrative examples shown in the accompanying drawings. Those of skill in the art will appreciate that the described embodiments are provided for purposes of illustration and understanding and that numerous equivalent embodiments are contemplated herein.

DETAILED DESCRIPTION OF THE INVENTION

Figure 1:
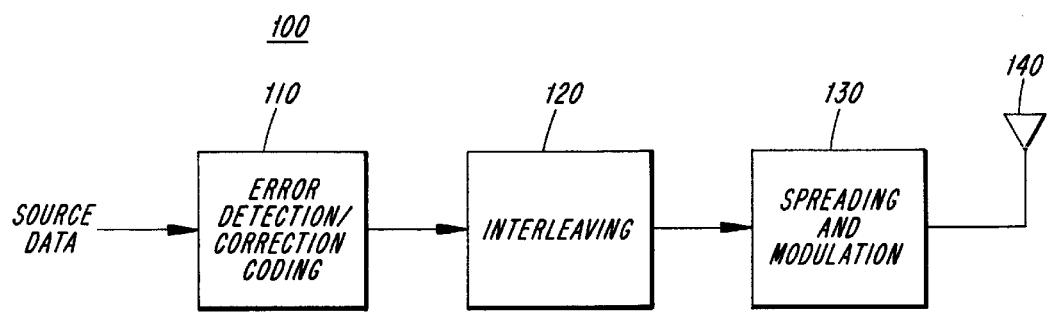
FIG. 1 depicts an exemplary spread spectrum transmitter in which variable rate spreading techniques according to the invention can be implemented.
Figure 2:
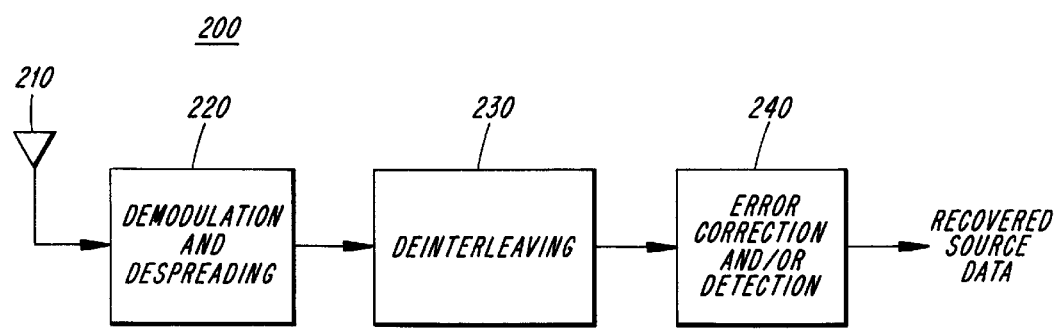
FIG. 2 depicts an exemplary spread spectrum receiver in which variable rate despreading techniques according to the invention can be implemented.

FIGS. 1 and 2 depict, respectively, an exemplary CDMA transmitter 100 and an exemplary CDMA receiver 200. In FIG. 1, the exemplary transmitter 100 includes an error detection and correction coding processor 110, an interleaver 120, a spreading and modulation processor 130, and a transmit antenna 140. In FIG. 2, the exemplary receiver 200 includes a receive antenna 210, a demodulation and despreading processor 220, a deinterleaver 230, and an error detection and correction decoding processor 240. Those of skill in the art will appreciate that the below described functionality of the components of FIGS. 1 and 2 can be implemented using known hardware techniques.

In the transmitter 100 of FIG. 1, a data source signal is applied to an input of the error detection and correction coding processor 110, and a coded data output of the error detection and correction processor 110 is coupled to an input of the interleaver 120. Additionally, an interleaved data output of the interleaver 120 is coupled to an input of the spreading and modulation processor 130, and a modulated, spread spectrum output of the spreading and modulation processor is coupled to the transmit antenna 140. In the receiver 200 of FIG. 2, an output of the receive antenna 210 is coupled to an input of the demodulation and despreading processor 220, and an output of the demodulation and despreading processor 220 is coupled to an input of the deinterleaver 230. Additionally, an output of the deinterleaver 230 is coupled to an input of the error detection and correction decoder 240, and an output of the error detection and correction decoder 240 represents a recovered source data output signal.

During transmit operation, source data symbols (e.g., successive bits output by a speech coder or by a multi-media application in a mobile telephony context) are channel coded by the error detection and correction processor 110 and the interleaver 120 to provide a stream of coded data symbols to the spreading and modulation processor 130. Specifically, the error and detection processor 110 improves communication link performance by adding redundant data bits to the source bits, thereby providing information which can be used in detecting and/or correcting source data errors during signal reception. Further, since error correction and detection typically works best when bit errors are distributed over a frame (e.g., so that several logical or transport channels within a frame include just a few bit errors, rather than any one of the logical or transport channels including many bit errors), the interleaver 120 then scrambles the time order of the error coded bits prior to transmission.

As is well known in the art, both the error detection/correction coding process and the interleaving process can be either convolutional or block based. Additionally, as is also well known in the art, the overall channel coding process can also include rate matching and multiplexing of multiple logical and physical channels so that the coded bit stream input to the spreading and modulation processor 130 can include data for a number of different channels. Typically, the coded bit stream includes a succession of multiple-bit frames, each frame being associated with a specific logical and physical channel (and thus being intended for transmission via a particular CDMA spreading code to a particular system user).

The spreading and modulation processor 130 processes the coded data stream to provide a continuous spread spectrum signal which is applied to the transmit antenna 140 for transmission across the air interface. More specifically, the spreading and modulation processor 130 spreads each coded data symbol in an outgoing frame by using a pseudo-noise (PN) sequence to either directly convert each coded data symbol into a plurality of transmit symbols which are in turn used to modulate a single carrier or a pair of carriers (known as direct sequence, or DS, CDMA) or to establish a sequence of carrier frequencies which are used in transmitting the coded data bits (known as frequency hopping, or FH, CDMA).

As is known in the art, the spreading process has the effect of spreading the bandwidth of the transmitted data signal across the entirety of an allocated portion of the available radio spectrum. However, since each active CDMA channel (and thus all of the data frames associated with each active channel) is assigned a unique and reproducible PN spreading sequence, a receiver programmed with the PN sequence assigned to a particular channel can readily recover that channel from among all others, as is well known in the art.

Thus, during receive operation, spread spectrum signals are received at the receive antenna 210, and the demodulation and despreading processor 220 recovers the coded data symbols by performing the inverse of the spreading and modulation process (i.e., using known PN sequences for particular users and channels). As is well known in the art, each data symbol can actually be despread using a number of PN sequences, each sequence being designed to recover a time-delayed version of a transmitted spread spectrum signal, and the multiple results can then be combined to provide the recovered coded data symbols. In other words, since multi-path fading across the air interface results in multiple versions of the transmitted signal arriving at the receiver, and since each delayed spread spectrum signal merely appears as a distinct CDMA channel (due to the autocorrelation properties of the PN spreading sequences), the receiver can provide time diversity as is well known in the art. A receiver which is configured to provide such time diversity is known in the art as a RAKE reciever. See, for example, T. Rappaport, Wireless Communications—Principles and Practice, Prentice Hall, 1996, pp. 335–338, which is incorporated herein by reference.

After demodulation and despreading, the deinterleaver 230 and the error detection and correction decoder 240 process the recovered coded data symbols to provide the recovered source data bits as desired. The deinterleaver 230 is essentially a buffer, or memory, which is used to store coded data symbols for the deinterleaving process. As is well known, an entire frame of data symbols must typically be available (i.e., stored in the deinterleaver memory) before deinterleaving for the frame can begin. According to the invention, the deinterleaver memory can be utilized for efficient variable-rate despreading.

Figure 3:
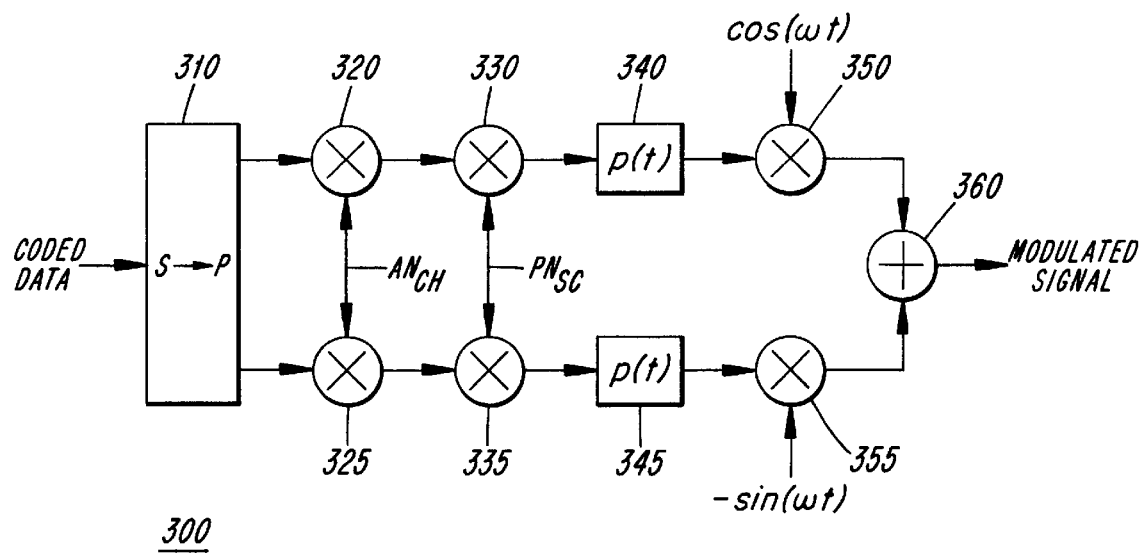
FIG. 3 depicts an exemplary spreading and modulation processor which can be used, for example, to implement the exemplary transmitter of FIG. 1.

To illuminate the various features and advantages of the spreading and despreading techniques of the invention, FIG. 3 depicts an exemplary direct sequence spreading and modulation processor 300 which can be used, for example, to implement the spreading and modulation processor 130 of FIG. 1. As shown, the exemplary DS processor 300 includes a parallel-to-serial converter 310, first and second channelization multipliers 320, 325, first and second randomization multipliers 330, 335, first and second pulse shaping filters 340, first and second modulation mixers 350, 355 and a combiner 360. As in FIGS. 1 and 2, those of ordinary skill in the art will appreciate that the below described functionality of the components of FIG. 3 can be implemented using known hardware techniques. Additionally, those of ordinary skill will appreciate that, although embodiments of the invention are described hereinafter with reference to direct sequence CDMA systems, the spreading and despreading techniques of the invention are equally applicable to frequency hopping CDMA systems.

In FIG. 3, a coded data signal is coupled to an input of the converter 310, and first and second outputs of the converter 310 are coupled to first inputs of the first and second channelization multipliers 320, 325, respectively. Additionally, a channelization spreading sequence $PN_{CH}$ is applied to second inputs of both the first and second channelization multipliers 320, 325, and outputs of the first and second channelization multipliers 320, 325 are coupled to first inputs of the first and second randomization multipliers 330, 335. A randomizing, or scrambling, spreading sequence $PN_{SC}$ is applied to second inputs of both the first and second randomization multipliers 330, 335, and outputs of the first and second randomization multipliers 330, 335 are coupled to inputs of the first and second pulse shaping filters 340, 345.

Further, outputs of the first and second pulse shaping filters 340, 345 are coupled to first inputs of the first and second modulation mixers 350, 355, respectively. An in-phase carrier signal $\cos(\omega t)$ is coupled to a second input of the first modulation mixer 350, and a quadrature carrier signal $\sin(\omega t)$ is coupled to a second input of the second modulation mixer 355. Finally, outputs of the first and second modulation mixers 350, 355 are coupled to first and second inputs of the combiner 360, and an output of the combiner 360 represents a modulated, spread spectrum transmit signal (e.g., for input to the antenna 140 of FIG. 1).

Generally, the processor 300 of FIG. 3 performs direct sequence spreading in combination with quadrature phase shift keying (QPSK) modulation. Specifically, the converter 310 receives successive data bits and provides pairs of bits to the channelization multipliers 320, 325. Each bit is then spread, via the channelization and scrambling multipliers 320, 325, 330, 335, using a channelization sequence $PN_{ch}$ and a randomization or scrambling sequence $PN_{SC}$. The dual spread bit streams are then shaped via the pulse shaping filters 340, 345 (which can be, for example, root-raised cosine functions), and the dual shaped signals are used to perform dual binary phase shift keying (BPSK) of the in-phase and quadrature carriers $\cos(\omega t)$, $-\sin(\omega t)$ (via the modulation mixers 350, 355). The dual BPSK signals are then combined via the combiner 360, and the resulting QPSK signal is transmitted to one or more CDMA receivers (e.g., via the transmit antenna 140 of FIG. 1).

As is well known, each CDMA channel uses a different channelization code $PN_{CH}$ so that multiple channels can be transmitted simultaneously (assuming the channel codes and the channels themselves are synchronized, as is also well known). Typically, the channelization codes are selected from a set of orthogonal variable spreading factor codes (OVSF) which provide for variable data throughput rates even while the chip rate (i.e., the rate at which the PN sequences are clocked into the multipliers 320, 325, 330, 335) remains constant (the spreading rate used for each particular data frame being transmitted with the frame itself). As noted above, however, such OVSF code sets require, according to conventional techniques, that a CDMA despreader include a buffer sufficient to collect all of the chips for an incoming data frame before despreading for the frame can be performed.

Figure 4:
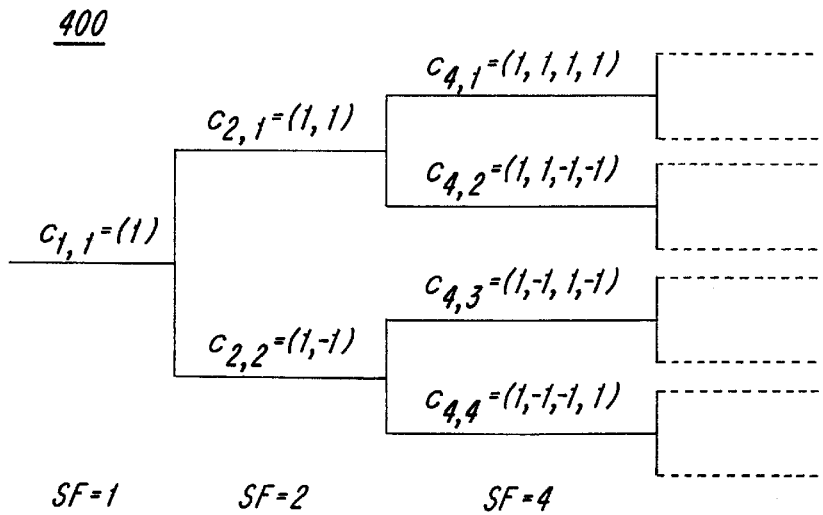
FIG. 4 depicts a number of exemplary orthogonal channelization spreading sequences which can be used in implementing the variable rate spreading and despreading techniques of the invention.

FIG. 4 depicts an OVSF code tree 400 including a known set of channelization sequences $c_{n,m}$, where n and m are integers representing the spreading factor and code number for each sequence, respectively. To preserve orthogonality, each user can, according to convention, actively use a particular code only if no other code on the path from that code to the root of the tree, or in the sub-tree below that code, is already being actively used.

Note that each code in the tree 400 is a subset of all codes in the sub-tree below that code (e.g., $c_{2,1}$ is a subset of both $c_{4,1}$ and $c_{4,2}$, and $c_{2,2}$ is a subset of both $c_{4,3}$ and $c_{4,4}$). Thus, if each user is limited to codes selected only from a particular branch of the code tree, as taught by the present invention, then it can be guaranteed that the code assigned to a user for a particular spreading factor will always be a subset of any code assigned to that user for a higher spreading factor (i.e., a slower data throughput rate). In other words, each code having a higher spreading factor can be constructed as an arithmetic combination of multiple codes having a lower spreading factor (e.g., one $c_{4,1}$ code is equivalent to two consecutive $c_{2,1}$ codes, and a $c_{4,2}$ code is equivalent to an ordinary $c_{2,1}$ code followed by an inverted $c_{2,1}$ code). Consequently, as is also taught by the present invention, a CDMA despreader can be constructed to operate properly without requiring a storage buffer sufficient to hold an entire frame of incoming chips.

Specifically, the present invention teaches that incoming chips can be despread using the minimum allowable spreading rate (i.e., the maximum data throughput rate) and stored in a memory sufficient to hold a frame of minimum spreading rate data symbols (e.g., in the memory of the deinterleaver 230, which must be of this size anyway). Thereafter, upon collecting the rate information symbols which are included within the incoming frame, a determination can be made as to whether despreading is complete. If it is determined that the frame was originally spread (e.g., at the transmitter 100) using the minimum allowable spreading factor, then the stored data symbols can be accepted as finally despread data symbols, and interleaving and error detection and correction decoding can be performed directly. Otherwise, the stored data symbols can be treated as soft symbols which can then be combined, using the known sub-set correspondence between fast and slow spreading factors for the user, to generate the finally despread data symbols. Such final despreading can be implemented, for example, directly within the deinterleaver 230.

Figure 5:
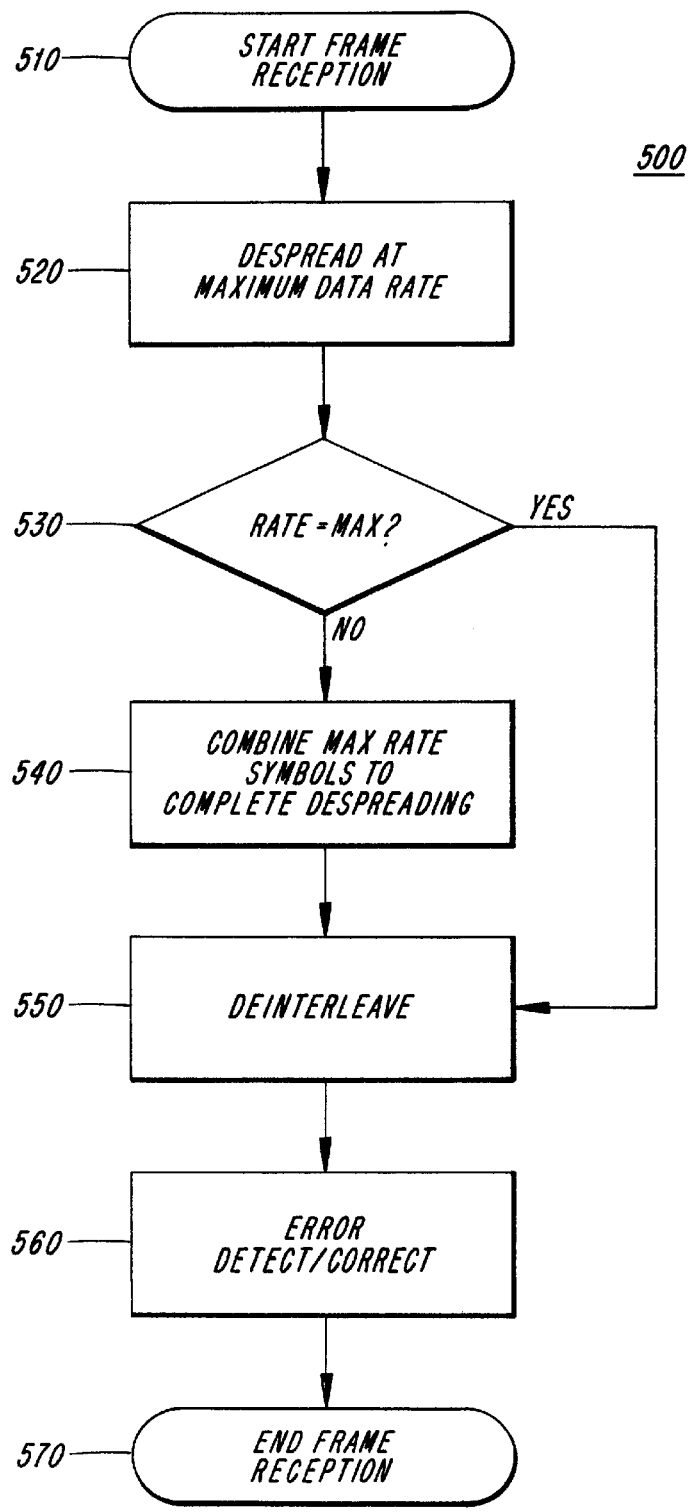
FIG. 5 depicts an exemplary method of despreading spread spectrum data packets according to the invention.

The above described despreading method of the invention is depicted in FIG. 5. As shown, in an exemplary method 500 (which can be implemented, for example, in the receiver 200 of FIG. 2), frame reception begins at a step 510, and incoming data symbols are despread assuming a minimum allowable spreading rate (or, equivalently, a maximum allowable data rate). Upon receiving and despreading an entire frame at the slower spreading rate (and storing the resulting data symbols in a memory included, for example, in a deinterleaver or error detection and correction decoder), rate information symbols within the data frame are interpreted, and a determination is made, at step 530, as to whether despreading is complete (i.e., whether the frame was indeed spread using the minimum spreading factor). If so, then deinterleaving and error detection and correction are carried out directly, at steps 550 and 560, before frame processing ends at step 570. Otherwise, the stored data symbols are first combined, at step 540, to provide the final despread data symbols.

By way of example, consider a scheme where only two spreading factors, either 2 or 4 chips per received symbol, are possible. Further assume that each incoming data frame consists of twenty chips (including either ten or five data symbols, depending upon which spreading factor is used for the frame) and either two rate information symbols or one rate information symbol. Then the two variants of received data frames are as shown in FIG. 6.

Specifically, a first variant 610 (corresponding to a spreading rate of 2) is shown to include ten data symbols A1–A10 and two rate information symbols RI1, RI2. Additionally, a second variant 620 (corresponding to a spreading rate of 4) is shown to include five data symbols B1–B5 and one rate information symbol RI. In each case, the short channelization code which is used to spread each symbol is shown immediately above the symbol (however, since the longer scrambling codes are the same for both cases, the scrambling codes are not shown).

Figure 6:
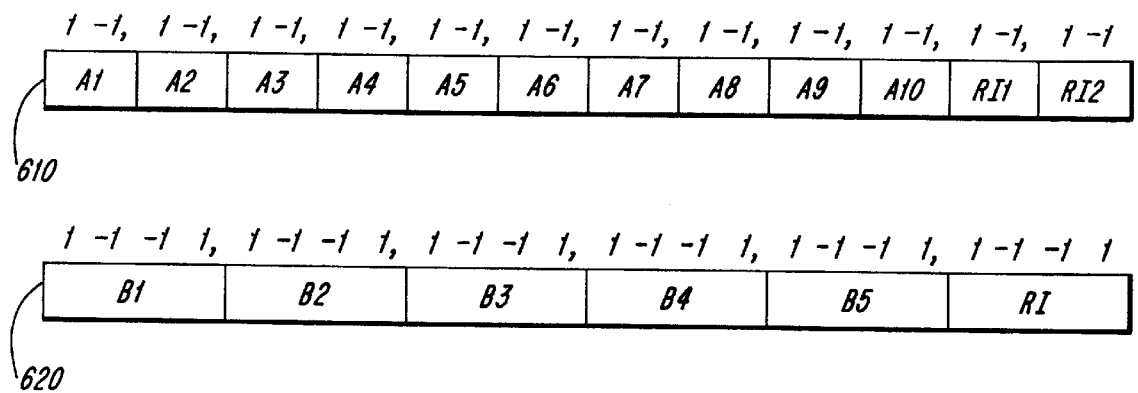
FIG. 6 depicts two exemplary spread spectrum data packets according to the invention, each data packet incorporating a different spreading factor.

Given the scenario of FIG. 6, the despreader can despread incoming data symbols using the minimum spreading factor of 2 and the corresponding spreading sequence (1, −1). At the end of the frame, the rate information is decoded, and it is thus known whether the despreading operation is finished. If not, then each pair of temporary symbols obtained by the first despreading operation can be combined to provide one despread symbol at the higher spreading factor. For example, the first data symbol at spreading rate 4 can be obtained as the first temporary symbol minus the second temporary symbol. Advantageously, this final combination can be made, for example, directly in the deinterleaver 230.

Generally, the present invention provides CDMA spreading and despreading techniques which eliminate the need for frame-length chip buffers within despreading and demodulation processors in CDMA receivers. According to the invention, successive CDMA frames are transmitted with variable spreading factors and a constant spreading sequence chip rate to provide a variable data throughput rate, each transmitted frame thus including a variable number of data symbols and a variable number of rate indication symbols. During transmission, channelization spreading sequences used for higher data rate frames are guaranteed to be subsets of channelization spreading sequences used for lower data rate frames. Consequently, a CDMA despreading processor according to the invention can despread incoming data symbols on the fly, storing the resulting symbols to a memory which must exist irrespective of the despreading process.

According to exemplary embodiments, a CDMA despreading and demodulation processor despreads incoming chips using a minimum allowable spreading rate. Thereafter, upon receiving the rate information symbols included in the incoming frame, a determination is made as to whether despreading is complete. If it is determined that the frame was spread using the minimum allowable spreading factor, then the stored data symbols are accepted as finally despread data symbols. Otherwise, the stored data symbols are taken to be temporary symbols which are then combined, using the guaranteed relationships between fast and slow spreading sequences, to generate the finally despread data symbols. Advantageously, a CDMA receiver according to the invention can thus operate successfully without requiring a frame-length chip buffer.

Those skilled in the art will appreciate that the present invention is not limited to the specific exemplary embodiments which have been described herein for purposes of illustration and that numerous alternative embodiments are also contemplated. For example, though the embodiments have been described primarily with reference to direct sequence CDMA systems, the variable rate spreading and despreading techniques of the invention are equally applicable in the context of frequency hopping CDMA systems. The scope of the invention is therefore defined by the claims appended hereto, rather than the foregoing description, and all equivalents which are consistent with the meaning of the claims are intended to be embraced therein.

What is claimed is:

1. A code division multiple access transmitter for transmitting a succession of source data frames, each source data frame including a sequence of source data symbols, and each source data frame being intended for a distinct recipient, said code division multiple access transmitter comprising:

a spreading and modulation processor configured to spread each source data symbol within a source data frame, using any one of a plurality of predefined spreading sequences, to provide a spread spectrum signal for transmission to one or more spread spectrum receivers, wherein each spreading sequence provides one of a plurality of possible spreading factors, wherein rate information is included in each transmitted data frame to indicate a spreading factor used in spreading the transmitted data frame, and wherein a first, higher-order spreading factor used in spreading data frames for a particular recipient is guaranteed to be an arithmetic combination of multiple copies of a second, lower-order spreading factor used in spreading data frames for the particular recipient, such that the arithmetic combination defines a relationship between the first and second spreading factors that can be used to combine the spread data symbols to recover the sequence of source data symbols with minimal despreading.

2. A method for transmitting a succession of code division multiple access source data frames, each source data frame including a sequence of source data symbols, and each source data frame being intended for a distinct recipient, said method comprising the steps of:

spreading each source data symbol within a source data frame, using any one of a plurality of predefined spreading sequences, to provide a spread spectrum signal for transmission to one or more spread spectrum receivers, each spreading sequence providing one of a plurality of possible spreading factors;

including rate information in each transmitted data frame to indicate a spreading factor used in spreading the transmitted data frame; and guaranteeing that a first, higher-order spreading factor used in spreading data frames for a particular recipient is an arithmetic combination of multiple copies of a second, lower-order spreading factor used in spreading data frames for the particular recipient, such that the arithmetic combination defines a relationship between the first and second spreading factors that can be used to combine the spread data symbols to recover the sequence of source data symbols with minimal despreading.

3. A code division multiple access receiver, comprising:

a despreading processor for despreading an incoming spread spectrum data frame based on a minimum allowable spreading factor; and a memory for storing data symbols resulting from the despreading based on the minimum allowable spreading factor, wherein the incoming data frame includes rate information indicating an actual spreading factor used in transmitting the incoming data frame, and wherein the data symbols stored in said memory as a result of the despreading based on the minimum allowable spreading factor are combined to provide refined data symbols when the actual spreading factor is determined to be greater than the minimum allowable spreading factor.

4. A code division multiple access receiver according to claim 3, further comprising a deinterleaver, wherein the deinterleaver is used as the memory for storing data symbols.

5. A method of receiving spread spectrum data frames, each data frame including rate information indicating an actual spreading factor used in transmitting the data frame, comprising the steps of:

despreading an incoming spread spectrum data frame using a minimum allowable spreading factor;

storing data symbols resulting from said step of despreading the incoming data frame to a memory;

decoding the rate information included in the incoming data frame to determine the actual spreading factor; and combining the data symbols stored in the memory to provide refined data symbols when the actual spreading factor is determined to be greater than the minimum allowable spreading factor.

6. A method according to claim 5, wherein the memory is a deinterleaver in a spread spectrum receiver.

* * * * *